United States Patent
Drücke et al.

(10) Patent No.: US 6,738,721 B1
(45) Date of Patent: May 18, 2004

(54) METHOD FOR IMPROVING THE MEASUREMENT VALUES OF AN INERTIAL MEASUREMENT SYSTEM

(75) Inventors: Peter Drücke, Bremen (DE); Thomas Hinsch, Ottersberg (DE)

(73) Assignee: Autoflug GmbH & Co. (DE)

( * ) Notice: Subject to any disclaimer, the term of this patent is extended or adjusted under 35 U.S.C. 154(b) by 0 days.

(21) Appl. No.: 09/868,734

(22) PCT Filed: Dec. 15, 1999

(86) PCT No.: PCT/DE99/04037
§ 371 (c)(1),
(2), (4) Date: Jun. 18, 2001

(87) PCT Pub. No.: WO00/37891
PCT Pub. Date: Jun. 29, 2000

(30) Foreign Application Priority Data

Dec. 18, 1998 (DE) .......................... 198 58 621

(51) Int. Cl.⁷ .................. G01C 17/38; G01P 21/00; G06F 25/00
(52) U.S. Cl. .................. 702/95; 73/1.38; 73/1.37
(58) Field of Search .................. 702/95, 96, 104, 702/141, 142; 73/1.37, 1.38, 1.75–1.79

(56) References Cited

U.S. PATENT DOCUMENTS

| | | | | |
|---|---|---|---|---|
| 4,188,816 A | * | 2/1980 | Mairson | 73/1.38 |
| 4,522,062 A | * | 6/1985 | Peters | 73/504.04 |
| 4,823,626 A | * | 4/1989 | Hartmann et al. | 74/5.34 |
| 4,841,773 A | * | 6/1989 | Stewart | 73/510 |
| 5,001,647 A | * | 3/1991 | Rapiejko et al. | 701/220 |
| 5,067,084 A | * | 11/1991 | Kau | 701/220 |
| 5,421,187 A | * | 6/1995 | Morgan | 73/1.78 |
| 5,527,003 A | * | 6/1996 | Diesel et al. | 244/195 |
| 5,890,093 A | * | 3/1999 | Mark et al. | 701/220 |
| 6,209,383 B1 | * | 3/2001 | Mueller et al. | 73/1.37 |

FOREIGN PATENT DOCUMENTS

| | | |
|---|---|---|
| DE | 4416586 A1 | 11/1995 |
| DE | 19721217 C1 | 8/1998 |

OTHER PUBLICATIONS

XP002138213, "Modern Inertial Technology" "Testing Inertial Sensors" pp. 239–259.

* cited by examiner

Primary Examiner—John E Barlow, Jr.
Assistant Examiner—Demetrius Pretlow
(74) Attorney, Agent, or Firm—R W Becker & Associates; R W Becker

(57) ABSTRACT

Inertial measurement systems for measuring accelerations and angular speeds are currently widely used in vehicles where they serve as sensors for safety devices and navigation systems. The required reliability and precision, however, can be obtained only with extremely accurate sensors and precise finishing. The invention therefore provides for a method according to which an inertial measurement system comprising economical, mass-produced sensors is first gauged overall in a testing device in one calibration operation. During gauging any offset, mounting position and scaling errors are detected as coefficients of coupling matrices of the sensors and converted into compensation values which are then used to improved the accuracy of the sensors' measurement values when the measurement system is in operation. The above method is suitable for inertial measurement systems in land, air and water craft.

9 Claims, 2 Drawing Sheets

METHOD FOR IMPROVING THE MEASUREMENT VALUES OF AN INERTIAL MEASUREMENT SYSTEM

BACKGROUND OF THE INVENTION

The invention relates to a method for improving measurement values of an inertial measurement system in accordance with the preamble to claim 1.

Such methods are used in inertial measurement systems that are currently widely used. For instance, they are used in regulation and control systems in which it is necessary to know the precise acceleration and angular speeds relative to an inertial coordinate system (fixed star system). Generally the earth-fixed system is used in a first approximation for the inertial reference system. Such measurement systems, also called inertial platforms, are used in very technically complex systems in the design and control of weapons or are employed in tilt regulation of high speed trains. Such systems will also soon be mass-produced as motor vehicles increasingly are equipped with airbags and side-impact protection and also with pitch and yaw stabilizers or navigation systems and use such systems to trigger and control these safety devices. Such devices are also required in the airline industry and naval engineering.

Thus, known from German Offenlegungsschrift 44 16 586 is a measurement system with angular speed and acceleration sensors and a computer unit, in which system the measurement values of the sensors are converted to output values that are related to an inertial coordinate system.

The sensors currently available for these measurement systems are still quite expensive when they have the necessary reliability and precision. Although sensors such as gyroscopes and accelerometers can be produced cost effectively as microelectronic components, when built-in they have substantial errors so that for constructing the measurement systems substantial production expenses, including the required alignment and compensation, are required to achieve acceptable error and offset tolerances.

It is therefore the object of the present invention to provide a method for improving the measurement values in which a measurement system built with inexpensive sensors for angular speeds and accelerations can be aligned and compensated in a simple manner.

SUMMARY OF THE INVENTION

This object is achieved by the features of claim 1.

The inventive method is particularly advantageous when employed in the manufacture of mass-produced articles since only limited personnel are required to set up the measurement system and the testing equipment. Complex mechanical alignment work is not necessary, nor are the alignment apparatus and aids required for such work. The inventive method is very suitable for a fully-automatic, economical in-process inspection of inertial measurement systems since it makes possible the use of simple sensors for angular speeds and accelerations that are inexpensive to produce and takes into account their production tolerances in the alignment or calibration of the measurement system so that the accuracy of the inertial measurement system is substantially improved thereby.

One of the most important requirements for the calibration or alignment of the sensors is the availability of calibration standards with great precision, that is, high accuracy of the absolute values for angular speed and acceleration as well as optimum reproducibility of excitation and angular position. For this, the measurement system is mounted on a precision rotary table, the axis of rotation of which is precisely horizontal. The assembly occurs such that coordinate axes of the measurement system and of the rotary table are parallel; parallel displacements are inconsequential for the result. Thus the measurement system can be subjected in a simple manner to two reference excitations. A dynamic excitation of the gyroscope by precise, constant rotation and a static excitation of the accelerometer can be realized in this simple manner by the gravitational acceleration.

The inventive method is also advantageously further developed in the subordinate claims.

It has proved advantageous for optimum testing, before the measurement on the rotary table, to perform measurement of the angular speed offset of the gyroscope and the acceleration offset of the accelerometer as a function of temperature, since these measurements are generally time-consuming.

BRIEF DESCRIPTION OF THE DRAWINGS

The invention is explained in more detail in the following with respect to the exemplary embodiment illustrated in the drawings, in which.

DESCRIPTION OF PREFERRED EMBODIMENTS

Figure 1:
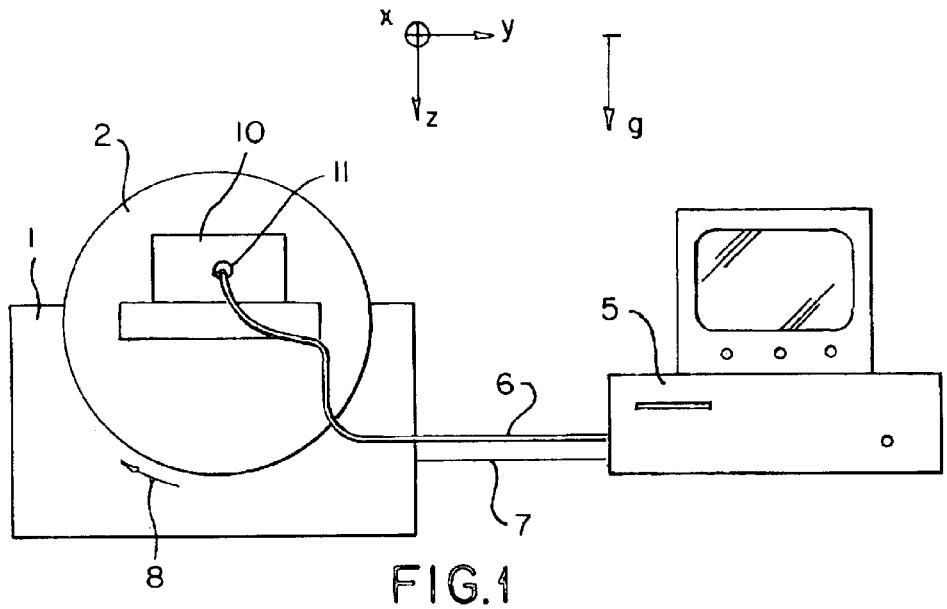
FIG. 1 is a basic drawing of the testing equipment with a measurement system.

As shown in FIG. 1, used for the inventive method is a precision rotary table 1 with a rotary mounting surface 2 rotatable about at least one axis and upon which the inertial measurement system 10 is mounted. For controlling the measurement process, the rotary table 1 is connected via a control cable 7 and the measurement system 10 is connected via a control and power cable 6 to a computer 5. Not only does the interface 11 of the measurement system 10, which interface is connected to the power cable 6, supply current, it also transmits data for control commands for activating the alignment and operational mode of the measurement system 10.

The indicated coordinate system x, y, z matches the physical axes of the measurement system 10 according to which the sensors of the measurement system 10, the accelerometer and angaular speed sensors, i.e., gyroscopes, are oriented. The x-axis in the drawing plane, or the longitudinal axis, of the measurement system 10 is parallel to the axis of rotation and oriented to the mounting surface 2. The rotation in the mathematically positive sense therefore occurs around the x-axis in the direction of the arrow 8. The y-coordinate corresponds to the transverse axis and the z-coordinate to the vertical axis of the measurement system 10.

For determining the alignment data, all of the sensors in the measurement system 10 must undergo a precise predetermined excitation. The gravitational acceleration $g=9.80665$ m/sec$^2$ is provided for exciting the accelerometer. In the illustrated position of the measurement system 10, the gravitational acceleration acts in the direction of the z-axis. In order to activate the direction of action for the y-axis, the measurement system must then be rotated exactly 90°. Rotating an additional 90° achieves the excitation of the accelerometer in the negative z-direction and the third 90° rotation makes possible the excitation in the negative y-coordinate axis. Furthermore, in this position the gyroscope that measures the angular speed is excited in the x-axis by a constant, uniform rotation around a predetermined angular range.

For measuring acceleration in the direction of the x-coordinate, the measurement system 10 is re-mounted so that the x-axis runs in the vertical and parallel to the gravitational vector g. In this position, the y-axis points to the rotary table so that the gyroscope oriented to the y-axis can be measured dynamically. Another change in mounting is required for measuring the gyroscope in the x-axis and the x-axis is oriented to the rotary table.

The measurement system must be mounted several times in a testing apparatus in accordance with FIG. 1 that has a mounting surface 2 with only one axis of rotation. The housing surfaces are the reference surfaces and must be finished in a strict orthogonal manner. However, since the reference surfaces are always formed by the housing surfaces, even when the measurement system 10 is in the latter usage position, this does not impose any limitation on precision.

Figure 2:
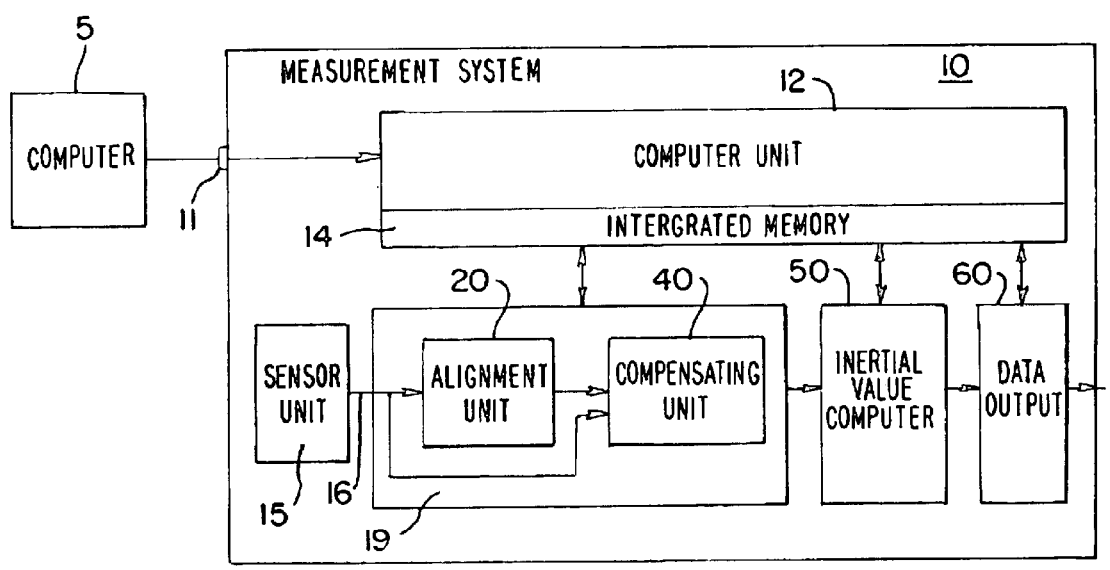
FIG. 2 is a circuit diagram of a measurement system.

FIG. 2 illustrates the basic structure of the measurement system 10. The measurement system 10 has a computer unit 12 with integrated memory 14 for data and programs and is connected to the computer 5 via the interface 11.

The computer unit 12 is also connected to a signal processor 16, an inertial value computer 50, and a data output 60 and controls the internal data processing of the measurement system 10 using the programs stored in the memory 14. The angular speeds and accelerations in an alignment unit 20 and a compensating unit 40 measured by a sensor unit 15, depending on alignment or operational mode, are prepared in a signal processor 16 for further processing in the inertial value computer 50.

Figure 3:
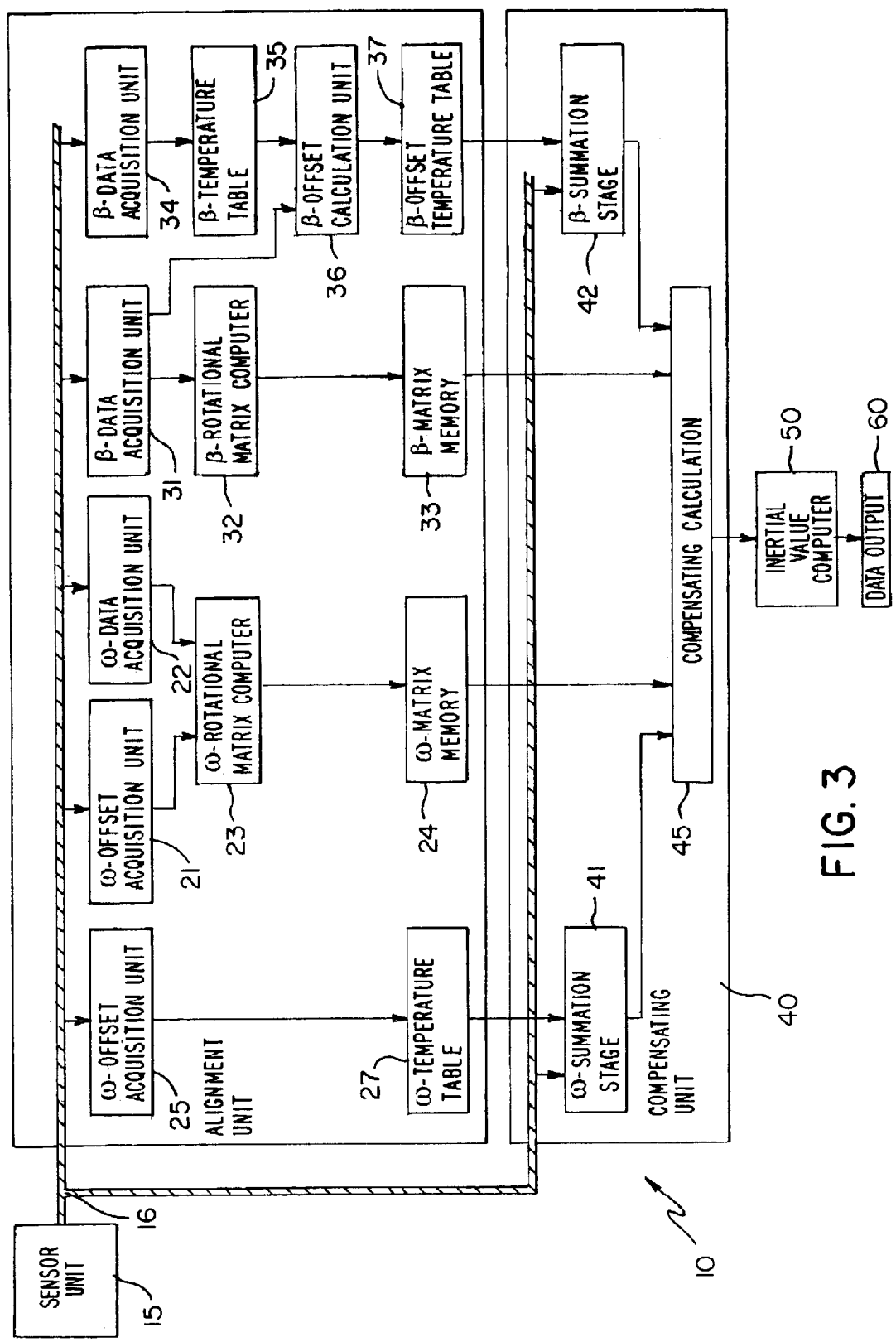
FIG. 3 is a functional diagram of the measurement system.

FIG. 3 illustrates the basic functions of the inventive measurement system 10 in a functional diagram. The sensor data, angular speed, acceleration, and temperature recorded by the sensor unit 15 are forwarded via the data bus 16 either to the alignment unit 20 or to the compensating unit 40. The selection of the function is performed from outside via the interface 11 in FIG. 1 by the control computer 5. The subsequent method steps are then triggered, program-controlled, by the computer unit 12. For the sake of simplification there are no lines drawn in from the computer unit 12 to the function blocks in FIG. 3.

The acceleration and angular speed measurement values recorded by the sensors fundamentally include errors. Offset, mounting position, and scaling errors are differentiated. Sensors that can now be produced in large numbers as microelectronic components must now be aligned with good precision when being integrated into the complete measurement systems and must be oriented to the coordinate axes x, y, z of the measurement system 10. Although the aforementioned errors do directly affect the measurement results, in the inventive method they are determined by reference measurement in the production test and are compensated when in operational use. As illustrated in FIG. 3, for this it is necessary to acquire and process separately the sensor data for the accelerometer and gyroscope for each coordinate axis x, y, z in the measurement system 10.

For each coordinate axis x, y, z the sensor unit 15 has one accelerometer each for the accelerations $a_x$, $a_y$, $a_z$, and one gyroscope each for the angular speeds $\omega_x$, $\omega_y$, $\omega_z$. The gravitational acceleration g=9.80665 m/sec² is used for the reference for the accelerometer. However, care must be taken that the acceleration sensor that is allocated to the coordinate axis of the measurement system 10 that is directed in the direction of the gravitational vector measures the negative gravitational acceleration.

For determining the alignment data for the accelerometer, the acceleration values $a_{nx}$, $a_{ny}$, $a_{nz}$ are transmitted from the sensor unit 15 to the alignment unit 20, whereby the coordinate axis allocation is characterized with the index n of the measurement cycle and with the indices x, y, z. For noise reduction, in an acceleration data acquisition unit 31 (B-data acquisition unit 31), a number of acceleration values $a_{nx}$, $a_{ny}$, $a_{nz}$ are recorded for each coordinate and the mean is found for 2000 typical measurements, for instance. A plurality of measurement cycles is conducted such that the measurement system 10 is rotated with its coordinate axes in the direction of the gravitational vector g or in the inverse direction. However, the measurement values of all of the acceleration sensors are always transmitted to the B-data acquisition unit 31. That is, starting with FIG. 1, first the z-axis matches the gravitational vector g so that the accelerations $a_{1z}$, $a_{1x}$, and $a_{1y}$ are transmitted to the B-data acquisition unit 31. The rotary table 2 is rotated precisely 90° in accordance with the arrow 8 and thus the y-axis is oriented to the gravitational vector g so that the acceleration values $a_{3y}$, and $a_{3x}$, $a_{3z}$ are determined. An additional 90° rotation causes the excitation of the accelerometer in the -z-axis and thus acquisition of the accelerations $a_{2z}$, and $a_{2x}$, $a_{2y}$. The third 90° rotation results in excitation in the negative y-coordinate axis and the accelerations $a_{4y}$, and $a_{4x}$, $a_{4z}$, which are also transmitted to the B-data acquisition unit 31. For measuring the acceleration sensor of the x-axis, the measurement system must be re-mounted so that the accelerations $a_{5x}$, and $a_{5y}$, $a_{5z}$ are measured and acquired. The accelerations $a_{6x}$, and $a_{6y}$, $a_{6z}$ are obtained by reversal, that is, by two 90° rotations and the effect of the gravitational vector on the accelerometer in the x-axis. The acceleration offset $\Delta a_x$, $\Delta a_y$, $\Delta a_z$ for each acceleration sensor is now calculated from each of the accelerations $a_1$, $a_3$, $a_5$ when the orientation is in the direction of the gravitational vector g and the accelerations $a_2$, $a_4$, $a_6$ when the orientation opposes the direction of the gravitational vector as follows:

$$\Delta a_x = \frac{a_{5x} + a_{6x}}{2} \quad (1)$$

$$\Delta a_y = \frac{a_{3y} + a_{4y}}{2}$$

$$\Delta a_z = \frac{a_{1z} + a_{2z}}{2}$$

There are cross couplings between the acceleration sensors in the coordinate axes x, y, z, which means that an acceleration excitation only acts precisely in one axis if all acceleration sensors are oriented precisely orthogonally with no installation errors. If this is not the case, the acceleration excitation also results in measurement values in the two other acceleration sensors. Furthermore, the measurement values are affected by the measurement amplification of each sensor. The fact that the measurement values $a_{nx}$, $a_{ny}$, $a_{nz}$ depend on the excitations $a_x$, $a_y$, $a_z$ and on the acceleration offsets $\Delta a_x$, $\Delta a_y$, $\Delta a_z$ is generally described by a system of equations in accordance with equation 2 in matrix form $$\begin{pmatrix} a_{nx} \\ a_{ny} \\ a_{nz} \end{pmatrix} = \begin{pmatrix} k_{11} & k_{12} & k_{13} \\ k_{21} & k_{22} & k_{23} \\ k_{31} & k_{32} & k_{33} \end{pmatrix} \cdot \begin{pmatrix} a_x \\ a_y \\ a_z \end{pmatrix} + \begin{pmatrix} \Delta a_x \\ \Delta a_y \\ \Delta a_z \end{pmatrix} \quad (2)$$

and can be illustrated briefly by equation 3

$$(A_n) = (K) \cdot (A) + (\Delta A) \quad (3),$$

whereby the coupling matrix K with the coefficients $K_{ij}$ (i, j=1, 2, 3) contains the mounting position deviations and scaling errors, that is, amplification errors.

The coefficients $K_{ij}$ of the rotational or coupling matrix K are calculated in a B-rotational matrix computer 32 from the acceleration values $a_{nx}$, $a_{ny}$, $a_{nz}$ present in the B-data acquisition unit 31, the acceleration offsets $\Delta a_x$, $\Delta a_y$, $\Delta a_z$, and the known reference excitations by the gravitational acceleration g, whereby the excitation vectors have the values $$x\text{-Achse: } (A) = \begin{pmatrix} -g \\ 0 \\ 0 \end{pmatrix}, y\text{-Achse: } (A) = \begin{pmatrix} 0 \\ -g \\ 0 \end{pmatrix} \text{ and } z\text{-Achse: } (A) = \begin{pmatrix} 0 \\ 0 \\ -g \end{pmatrix}$$

when each coordinate axis is oriented to the gravitational vector. In addition, the matrix $K^{-1}$ inverse to the coupling matrix is formed with the correction values $K_{ij}$ (i, j=1, 2, 3), equation 4:

$$K^{-1} = \begin{pmatrix} K_{11} & K_{12} & K_{13} \\ K_{21} & K_{22} & K_{23} \\ K_{31} & K_{32} & K_{33} \end{pmatrix}, \quad (4)$$

which is stored in the B-matrix memory 33 for compensating the measurement values that occur when the measurement system 10 is operated normally.

The alignment data for the gyroscope are determined in a manner similar to that of the accelerometer. The rotary plate 2 of the precision rotary table 1 is the reference when the gyroscope is in the static rest state and for the dynamic excitation. The three coordinate axes x, y, z of the measurement system 10 are oriented successively to the axis of rotation of the rotary table 1, which must be done by re-mounting when a rotary table 1 such as that shown in FIG. 1 is used that permits rotational movement around only one axis.

First the angular speeds $\omega_{0x}$, $\omega_{0y}$, $\omega_{0z}$ of the angular speed sensors are measured while the rotary table 1 is resting. For angular speed sensors, one gyroscope is provided in the sensor unit 15 for each coordinate axis x, y, z of the measurement system 10. The measurement values $\omega_{0x}$, $\omega_{0y}$, $\omega_{0z}$ of these gyroscopes are taken from the ω-offset acquisition unit 21 via the data bus 16 and stored. Then the rotary table 1 is driven and the measurement system 10 is rotated around the coordinate axis x of the measurement system 10, which axis corresponds to the axis of rotation of the rotary table 1, at a constant, precisely defined angular speed of ω=70°/sec. The predetermined angular speed $\omega_x$ is kept constant via a limited angle of rotation range since this angular speed $\omega_x$ forms the reference for calculating the gyroscope correction data. The measurement values $\omega_{1x}$, $\omega_{1y}$, $\omega_{1z}$ of all three gyroscopes are measured multiple times in the ω-data acquisition unit 22 during the available measurement time, then the mean is found and stored. If, after both remounting procedures, the ω-offset is also present when oriented to the two other coordinate axes y, z in the ω-offset acquisition unit 21 and the angular speed measurement values $\omega_{nx}$, $\omega_{ny}$, $\omega_{nz}$ (n=2, 3) are present in the ω-data acquisition unit 22, the angular speed values $\omega_{nx}$, $\omega_{ny}$, $\omega_{nz}$ (n=1, 2, 3) are corrected by the offsets $\omega_{0x}$, $\omega_{0y}$, $\omega_{0z}$ in the ω-rotation matrix computer 23 and the rotation matrix $K_\omega$ is calculated using the coefficients $k^{ij}$ in accordance with equation 5:

$$\begin{pmatrix} \omega_{nx} \\ \omega_{ny} \\ \omega_{nz} \end{pmatrix} = \begin{pmatrix} K'_{11} & K'_{12} & K'_{13} \\ K'_{21} & K'_{22} & K'_{23} \\ K'_{31} & K'_{32} & K'_{33} \end{pmatrix} \cdot \begin{pmatrix} \omega_{nx} \\ \omega_{ny} \\ \omega_{nz} \end{pmatrix} + \begin{pmatrix} \omega_{ox} \\ \omega_{oy} \\ \omega_{oz} \end{pmatrix} \quad (5)$$

The inverse matrix $K_\omega^{-1}$ is also formed for the angular speeds and stored as correction matrix with the correction values (coefficients) $K_{ij}$(i, j=1,2,3) in the ω-matrix memory 23.

In real test operations for such measurement systems 10, the way in which the measurement program runs is optimized in terms of mounting changes. This deviates from the illustration shown here of the sequence angular speed and acceleration measurements in that, in every mounting position of the measurement system 10, all necessary angular speed and acceleration measurements are performed independently of the previously described sequence and after the conclusion of all measurements the rotary matrices are calculated in the rotary matrix computers 23 and 24.

The gyroscopes and acceleration sensors are generally temperature-sensitive. In the alignment unit 20, therefore, offset acquisition is provided depending on temperature. As a rule, temperature cycles are very time-consuming so that equalizing processes can deteriorate when there are changes in temperature. For the temperature-dependent measurements, the measurement system 10 remains in a defined rest position without the slightest movement. With the temperature value θ of the temperature sensor in the sensor unit 15, the measurement values of the gyroscope $\omega_x(\theta)$, $\omega_y(\theta)$, $\omega_z(\theta)$ are transmitted to the temperature-dependent ω-offset acquisition unit 25 and the measurement values of the acceleration sensors $a_x(\theta)$, $a_y(\theta)$, $a_z(\theta)$ are transmitted to the temperature-sensitive B-data acquisition unit 34. Once the mean of numerous measurement data at the same temperature θ is found, the ω-offsets are stored in a ω-temperature table 27. The mean for the acceleration values $a_x(\theta)$, $a_y(\theta)$, $a_z(\theta)$ is found and stored in a B-temperature table 35 as relative acceleration values. The relative acceleration values in the B-temperature table 35 are then corrected to an acceleration offset in a B-offset calculation unit 36 with the absolute acceleration values calculated in the B-data acquisition unit 31 and are stored in the B-offset temperature table 37.

Once the measurement system 10 has switched to the normal operational mode due to a program control, the measurement values in the sensor unit 15, that is, the accelerations $a_{nx}$, $a_{ny}$, $a_{nz}$, the angular speeds $\omega_{nx}$, $\omega_{ny}$, $\omega_{nz}$, and the temperature θ, are transmitted via the data bus 16 to the compensating unit 40. In the compensating unit 40, in conformity with the temperature θ, first the offset correction of the angular speed $\omega_{nx}$, $\omega_{ny}$, $\omega_{nz}$ occurs with the values from the ω-temperature table 27 in a ω-summation stage 41. Likewise, the acceleration values $a_{nx}$, $a_{ny}$, $a_{nz}$ are corrected in the B-summation stage 42 with temperature-dependent acceleration offsets from the B-temperature table 37. The output values for summation stages 41 and 42 thus represent the angular speeds and accelerations corrected by the offsets, whose mounting position errors and scaling errors are optimized in a compensating calculation 45 using the compensation matrices from the ω-matrix memory 24 and the B-matrix memory 33. The measurement values thus compensated and optimized are converted in an inertial value computer 50 using the known Euler transformation method into angular speeds and accelerations of an inertial reference system and are provided in a data output 60. They indicate the movement of the measurement system 10, i.e., the movement of the device connected to this measurement system 10 in this inertial reference system.

In another embodiment of the inventive method, more measurement values are regularly acquired for acceleration $a_{nx}$, $a_{ny}$, $a_{nz}$ and angular speed $\omega_{nx}$, $\omega_{ny}$, $\omega_{nz}$ by the sensor unit 15 in FIG. 2 than is necessary for calculating the coupling matrices K and $K_\omega$. The measurement system 10 can then also assume angular positions that deviate from the vertical. Since the coefficients of the coupling matrices K and $K_\omega$ are linearly independent, the matrix equations described by equations 2 and 5 are expanded according to the number of measurement results and the rotational or coupling matrices K, $K_\omega$, or matrices $K^{-1}$, $K_\omega^{-1}$, which are the inverse thereto, are calculated in a known regression calculation method implemented in the computer unit 12.

As a modification to the described exemplary embodiment, the alignment of the measurement system 10 can occur without remounting if, instead of a single-axis rotary table 1, a precision rotary table is used that has a mounting surface that can be rotated around three coordinate axes. Such a solution is advantageous for a practical, automatic testing operation, but does not further improve the quality of the alignment.

Another modification of the measurement method for a comparable measurement system results with a reduced number of sensors. Because the method is just as well-suited for alignment and compensation when a measurement system comprises only one or two sensors, whether these are gyroscopes or accelerometers. For this, the measurement process must be adapted and the compensation matrices and memory functions must be reduced, which would be very simple for one skilled in the art who is familiar with this method.

The specification incorporates by reference the disclosure of German priority documents 198 58 621.3 of Dec. 18, 1998 and PCT/DE99/04037 of Dec. 15, 1999.

The present invention is, of course, in no way restricted to the specific disclosure of the specification and drawings, but also encompasses any modifications within the scope of the appended claims.

What is claimed is:

1. A method for improving the measurement values of an inertial measurement system that includes a computer for coordinate conversion and for each coordinate axis x, y, z, includes a sensor for accelerations and a sensor for angular speeds that are measured in a coordinate system allocated to the orthogonal axes of the measurement system and are converted such that the output values are provided in an inertial system, said method including the steps of:
    compensating measurement values of the sensors with correction values obtained in an alignment mode,
    wherein in said alignment mode, the measurement system is mounted on a testing device, wherein said testing device has a mounting surface rotatable about at least one coordinate axis, such that orthogonal coordinate axes of the testing device and measurement system are parallel, wherein each coordinate axis of the measurement system is successively oriented in the vertical and in the inverse vertical and in the direction of the axis of rotation of the testing device, wherein for each orientation of said measurement system, the measurement values of said sensors are acquired, and wherein, taking into account a linear equation system for cross couplings of the sensors, the correction values are calculated from the measurement values stored in a memory.

2. A method according to claim 1, wherein when the measurement system is in a state of rest, the measurement values of the angular speed sensors are acquired as angular speed.

3. A method according to claim 2, wherein the measurement system is rotated at a constant angular speed about a coordinate axis that is oriented to the axis of rotation, wherein the measurement values of the angular speed sensors are acquired continuously, and wherein correction values are calculated from the angular speeds and the angular speed offsets as coefficients of a compensation matrix of said angular speeds.

4. A method according to claim 3, wherein for an acceleration sensor that coincides with the vertical, with the gravitational acceleration as a reference, an acceleration offset is calculated from the measurement values of the acceleration sensor in the vertical and in the vertical inverse thereto by finding a mean, and wherein correction values are calculated with the measurement values allocated to the coordinate axes and the acceleration offsets as coefficients of a compensation matrix of the accelerations.

5. A method according to claim 4, wherein the compensation matrices are stored in said memory.

6. A method according to claim 1, wherein the measurement system in a state of rest, is subjected to a temperature cycle, wherein measurement values of angular speed sensors are stored as temperature-dependent angular speed offsets in a ω-temperature table together with an associated temperature, wherein temperature-dependent measurement values of acceleration sensors are stored in a B-temperature table, and wherein for each acceleration sensor, temperature-dependent acceleration offsets are determined from the stored temperature-dependent measurement values and from the measurement values in the vertical and in the inverse vertical and are stored in a B-offset temperature table.

7. A method according to claim 6, wherein measurement values of angular speed and acceleration sensors are corrected by angular speed and acceleration offsets stored in said tables, as a function of the temperature.

8. A method according to claim 6, wherein compensation of measurement values is performed using compensation matrices stored in the memories.

9. A method according to claim 1, wherein more than a required number of available measurement values are used in a linear regression method for calculating the coefficients of the linear equation system.

* * * * *